United States Patent
Patole et al.

(10) Patent No.: US 11,448,747 B2
(45) Date of Patent: Sep. 20, 2022

(54) TIME-OF-FLIGHT DETERMINATION OF USER INTENT

(71) Applicant: Apple Inc., Cupertino, CA (US)

(72) Inventors: Sujeet Milind Patole, Cupertino, CA (US); Jouya Jadidian, Saratoga, CA (US); Mikheil Tsiklauri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 16/583,493

(22) Filed: Sep. 26, 2019

(65) Prior Publication Data

US 2021/0096237 A1 Apr. 1, 2021

(51) Int. Cl.
*G01S 13/62* (2006.01)
*G06F 3/04847* (2022.01)

(52) U.S. Cl.
CPC .......... *G01S 13/62* (2013.01); *G06F 3/04847* (2013.01)

(58) Field of Classification Search
CPC .......... G01S 13/62; G01S 13/70; G01S 7/411; G01S 13/08; G01S 13/0209; G06F 3/04847; H04W 4/023; H04W 4/80; H04W 52/0254; H04W 52/0267; H04W 88/02; Y02D 30/70
See application file for complete search history.

(56) References Cited

U.S. PATENT DOCUMENTS

| | | | |
|---|---|---|---|
| 7,843,379 B2 | 11/2010 | Menzer | |
| 10,036,806 B2 | 7/2018 | Wijbrans | |
| 10,140,834 B2 | 11/2018 | Barcala | |
| 2011/0119640 A1* | 5/2011 | Berkes | G06F 3/017 715/863 |

(Continued)

FOREIGN PATENT DOCUMENTS

| | | |
|---|---|---|
| CN | 108415025 A | 8/2018 |
| EP | 2587347 A2 | 5/2013 |
| KR | 10-2013-0043150 | 4/2013 |

OTHER PUBLICATIONS

Extended European Search Report for Application EP 20194873.4, dated Jan. 28, 2021, 9 pages.

(Continued)

*Primary Examiner* — John T Repsher, III
(74) *Attorney, Agent, or Firm* — Kowert, Hood, Munyon, Rankin & Goetzel, P.C.

(57) ABSTRACT

An electronic device that selectively performs a predefined action is described. The predefined action can be any action performed by the electronic device, such as changing the power state of the electronic device or a component, change the state of a display, initiating a process, ending a process, etc. During operation, the electronic device may transmit a wireless signal. Then, the electronic device may receive a wireless-return signal associated with an object, which can indicate a time-of-flight of the wireless signal between the electronic device and the object. Moreover, the electronic device may determine a range between the electronic device (Continued)

and the object based at least in part on the wireless-return signal. When the range between the electronic device and the object is less than a threshold value, the electronic device may determine: whether the range between the electronic device and the object is varying and/or whether to perform the predefined action.

20 Claims, 9 Drawing Sheets

(56) References Cited

U.S. PATENT DOCUMENTS

| | | | | |
|---|---|---|---|---|
| 2016/0034050 | A1* | 2/2016 | Ady | G06F 1/3265 |
| | | | | 345/619 |
| 2017/0187867 | A1* | 6/2017 | Schrage | H04M 1/67 |
| 2017/0242473 | A1* | 8/2017 | Bostick | G06F 9/4418 |
| 2017/0289766 | A1* | 10/2017 | Scott | H04W 4/023 |
| 2017/0357788 | A1* | 12/2017 | Ledvina | G06F 21/35 |
| 2018/0224980 | A1 | 8/2018 | Avila et al. | |
| 2018/0329050 | A1* | 11/2018 | Amihood | G01S 7/02 |
| 2018/0375858 | A1* | 12/2018 | Watanabe | G06K 9/00892 |
| 2020/0413216 | A1* | 12/2020 | Robertson | H04W 4/021 |

OTHER PUBLICATIONS

Office Action for KR Patent Application No. 10-2020-0120586; dated Sep. 3, 2021.

* cited by examiner

TIME-OF-FLIGHT DETERMINATION OF USER INTENT

FIELD

The described embodiments relate, generally, to communication of wireless signals by an electronic device, including techniques for determining presence and a varying range between an electronic device and an individual using a time-of-flight measurement.

BACKGROUND

A user interface for an electronic device should require little or no training or advanced knowledge by a user for proper operation. Moreover, the user interface should be tailored to a user's preferences and their mental model of a task. These attributes help ensure that the user interface is intuitive and easy to use, which improves user efficiency and customer satisfaction.

However, many existing user interfaces in electronic devices do not achieve these ideals. Consequently, these existing user interfaces can be cumbersome and difficult for users to interact with effectively.

For example, based on advances in speech recognition, many electronic devices now include voice user interfaces. A voice user interface allows a user to control and, more generally, interact with an electronic device by simply speaking with it.

Many voice user interfaces are based, at least in part, on predefined keywords or commands, such as a wake word that is used to activate an electronic device. Users may need to memorize the predefined keywords or commands, which can increase the time required to become proficient in system operations.

Furthermore, accurately identifying a user of the voice user interface is often challenging, which may make it more difficult to accurately customize a voice user interface to the preferences and needs of a particular user.

SUMMARY

An electronic device that selectively performs a predefined action is described. This electronic device may include: an antenna; a radio-frequency (RF) transceiver communicatively coupled to the antenna; and an integrated circuit coupled to the RF transceiver. During operation, the electronic device may transmit a wireless signal. Then, the electronic device may receive a wireless-return signal associated with an object, which can indicate a time-of-flight of the wireless signal between the electronic device and the object. Moreover, the electronic device may determine a range between the electronic device and the object based at least in part on the wireless-return signal. When the range between the electronic device and the object is less than a threshold value, the electronic device may: determine that the range between the electronic device and the object is varying; and perform the predefined action.

Moreover, the threshold value may correspond to a time for the electronic device to transition from a first state to a second state, and the predefined action may include transitioning the electronic device from the first state to the second state. Note that the first state may have a lower power consumption than the second state. For example, in the second state, a memory in the electronic device (such as a solid-state drive) may be powered on. In some embodiments, the electronic device may: detect, after transitioning to the second state, interaction by an individual with a user-interface device associated with the electronic device; and transition a display associated with the electronic device from a low-power state to a higher-power state.

Furthermore, the electronic device may modify the threshold value based at least in part on an environment of the electronic device. For example, the environment may include a distance between the electronic device and a boundary in the environment.

Additionally, the object may be an individual.

In some embodiments, the transitioning from the first state to the second state is further based at least in part on an intent associated with the object. For example, the intent may correspond to a rate of the change. Alternatively or additionally, the intent may correspond to a degree of the change.

Moreover, the predefined action may include changing a font or a user interface presented on the display associated with the electronic device. Alternatively or additionally, the predefined action may include changing content presented on the display associated with the electronic device. In some embodiments, the predefined action is further based at least in part on a context of the object. For example, when the object is an individual, the context may include the individual sitting or standing.

Note that the electronic device may include a vehicle, a door, a computer, etc.

Other embodiments provide the RF transceiver and/or the integrated circuit for performing any/all of the disclosed operations.

Other embodiments provide a second electronic device that determines a range between the second electronic device and an object based at least in part on a wireless-return signal. When the range between the second electronic device and the object is less than a threshold value, the second electronic device may determine whether the range between the electronic device and the object is varying. Then, the second electronic device may communicate this information to an electronic device, so that the electronic device may selectively perform a predefined action.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method for selectively performing the predefined action. The method includes at least some of the aforementioned operations performed by the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
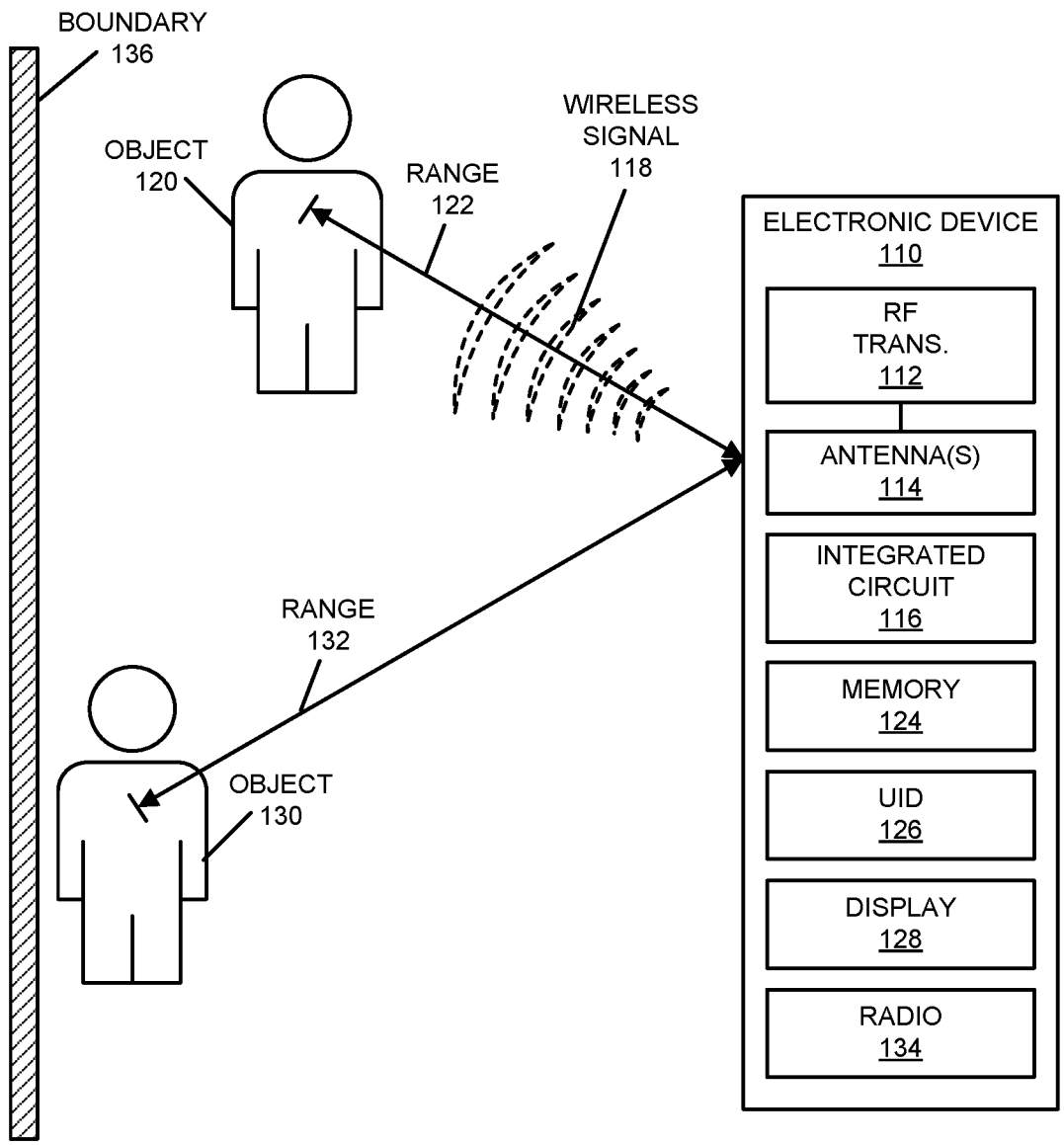
FIG. 1 is a block diagram illustrating an example of measurements performed by an electronic device.

An electronic device that selectively performs a predefined action is described. The predefined action can be any action performed by the electronic device, such as changing the power state of the electronic device or a component, change the state of a display, initiating a process, ending a process, etc. During operation, the electronic device may transmit a wireless signal. Then, the electronic device may receive a wireless-return signal associated with an object, which can indicate a time-of-flight of the wireless signal between the electronic device and the object. Moreover, the electronic device may determine a range between the electronic device and the object based at least in part on the wireless-return signal. When the range between the electronic device and the object is less than a threshold value, the electronic device may determine: whether the range between the electronic device and the object is varying and/or whether to perform the predefined action.

For example, the threshold value may correspond to a time for the electronic device to transition from a first state to a second state, and the predefined action may include transitioning the electronic device from the first state to the second state. Alternatively or additionally, the predefined action may include changing a font or a user interface presented on a display associated with the electronic device.

In some embodiments, the predefined action may include changing content presented on the display associated with the electronic device.

By selectively performing the predefined action, these disclosed techniques may facilitate automatic responses by the electronic device to changes in the surrounding environment. Notably, the electronic device may dynamically adapt to the time-varying position of the object (such as an individual or a user of the electronic device). This capability may provide an enhanced user experience, in which the electronic device appropriately responds to an intent of the individual without requiring the individual to take or perform any additional action (such as providing a voice command or interacting with a user-interface device). Therefore, the disclosed techniques may allow the electronic device to anticipate the individual's goals and to respond accordingly. This intuitive response by an electronic device may represent a significant improvement in the user experience and may allow the individual to seamlessly use the electronic device with reduced or minimal effort. Collectively, these capabilities may increase customer satisfaction with, and loyalty to, the electronic device.

In the discussion that follows, the electronic device may communicate the wireless signals and may perform the measurements of the wireless signals in one or more bands of frequencies. For example, the wireless signals may have one or more carrier or fundamental frequencies between 3.1-10.6 GHz (such as between 6-8 GHz). Notably, the wireless signals may be compatible with or may use UWB or 'pulse radio', and/or may be compatible with an IEEE 802.15 standard (such as IEEE 802.15.4). More generally, the wireless signals may have one or more carrier or fundamental frequencies between 300 MHz and 100 GHz, and a bandwidth of at least 500 MHz or 20% of the carrier frequency. In some embodiments, the wireless signals include or otherwise represent pulses. By using pulses with wide bandwidths (such as greater than or equal to 500 MHz), the uncertainty of the pulse timing ($\Delta t$) may be small enough to allow precise determination or estimation of range, such as a range resolution of less than a few centimeters (e.g., an accuracy on the order of a millimeter, several millimeters, etc.). In some embodiments, the range resolution may be between 100 µm and 10 cm. In other embodiments, one or more other frequency ranges, bandwidths, protocols, and/or other wireless characteristics may be implemented.

Note that the disclosed techniques in the following discussion may be used in conjunction with one or more other wireless ranging or location techniques in accordance with a communication protocol, such as a communication protocol that is compatible with an IEEE 802.11 standard (which is sometimes referred to as Wi-Fi). In some embodiments, the disclosed techniques are used with IEEE 802.11ba and/or IEEE 802.11ax. However, the disclosed techniques may also be used with a wide variety of other communication protocols, and in electronic devices (such as portable electronic devices or mobile devices) that can incorporate multiple different radio access technologies (RATs) to provide connections through different wireless networks that offer different location-based services and/or capabilities.

Therefore, the electronic device can include hardware and software to support a wireless personal area network (WPAN) according to a WPAN communication protocol, such as those standardized by the Bluetooth Special Interest Group (in Kirkland, Wash.) or other companies. Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point.

Additionally, it should be understood that, in some embodiments, the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of measurements performed by an electronic device 110. For example, electronic device 110 may include: a computer, e.g., a laptop, a notebook computer, or a tablet; a smartphone or a wearable device, e.g., a smartwatch; a portal, e.g., a door, a window, a gate, or a trunk; a vehicle, e.g., a car, a truck, an SUV, a motorcycle, etc.; a wireless speaker; an IoT device; a set-top box; a security device; or another type of electronic device. Electronic device 110 may include an RF transceiver (such as RF transceiver 112, which may include at least one transmitter and at least one receiver, or a reconfigurable transmitter/receiver), and one or more antennas 114. Moreover, electronic device 110 may include an integrated circuit 116 (such as a processor or a control circuit) that is coupled to the RF transceiver 112, e.g., by wired and/or wireless links or connections.

As described further below with reference to FIGS. 3 and 4, during operation electronic device 110 may transmit a wireless signal 118 (such as UWB) using RF transceiver 112 and the one or more antennas 114. Then, electronic device 110 may receive and/or measure a wireless-return signal associated with an object 120 (such as an individual or an electronic device associated with an individual) within a time-of-flight of wireless signal 118 in a direct path between electronic device 110 and object 120. This may help reduce or eliminate the impact of a multi-path signal that may arrive later than a direct-path signal. Next, based at least in part on the wireless-return signal, integrated circuit 116 may determine (or estimate) a range 122 (or distance) between electronic device 110 and object 120.

When range 122 between electronic device 110 and object 120 is less than a threshold value (such as, e.g., 1-10 m), integrated circuit 116 may: determine that range 122 between electronic device 110 and object 120 is varying (such as decreasing); and perform a predefined action. Note that, in some implementations, the threshold value may correspond to a time for electronic device 110 to transition from a first state to a second state, and the predefined action may include transitioning electronic device 110 from the first state to the second state, such as, e.g., a time between 1-10 s or a distance between 1 and 10 m. In some embodiments, the first state may have a lower power consumption than the second state. For example, in the second state, a memory 124 in electronic device 110 (such as a solid-state drive) may be powered on. In this way, memory 124 may be powered on as an individual approaches electronic device 110, so that electronic device 110 is ready for use when the individual arrives at or is in proximity to electronic device 110. In some embodiments, electronic device 110 may: detect, after transitioning to the second state, contact by the individual with or use of a user-interface device (UID) 126 (such as a mouse, a keyboard, a track pad, a touch-sensitive display, a voice user interface, etc.) associated with electronic device 110; and transition a display 128 associated with electronic device 110 from a low-power (or lower-power) state to a higher-power state. Thus, components (such as memory 124) that take longer to power on or transition may be powered on when the individual approaches electronic device 110, while other components (such as display 128) that transition or power on more rapidly may be powered on when the individual is closer to, proximate to, or in contact with electronic device 110.

In some embodiments, electronic device 110 adapts to an environment of electronic device 110. Notably, electronic device 110 may modify the threshold value based at least in part on the environment. This may correct for or reduce the effect of interference or multi-path signals. For example, the environment may include a distance between electronic device 110 and a boundary 136 in the environment, such as a wall, which may restrict an area over which time-of-flight estimation can occur.

By determining range 122 is less than the threshold value and is varying, electronic device 110 may determine (or infer) an intent associated with object 120, and the transitioning from the first state to the second state may be based at least in part on the intent. For example, the intent may include or correspond to a rate of the change (such as, e.g., a speed greater than 0.5 m/s). This may allow electronic device 110 to determine that the individual is approaching electronic device 110 and intends to use electronic device 110. In contrast, object 130 (which may be another individual) may be moving, but parallel to electronic device 110 (e.g., range 132 to object 130 may not be varying or may not be changing significantly). This may indicate that object 130 does not want to interact with electronic device 110. Therefore, in this case, electronic device 110 may not transition from the first state to the second state, even if range 132 is less than the threshold value.

While the transitioning from the first state to the second state is used as an illustration in the present discussion, in other embodiments the predefined action may be different. For example, as described further below with reference to FIGS. 5-8, the predefined action may include changing a font or a user interface displayed on display 128 associated with electronic device 110. Alternatively or additionally, the predefined action may include changing content displayed on display 128 associated with electronic device 110. Note that the predefined action may include unlocking or opening a portal or a door, or otherwise removing a security feature or making a device accessible. In some embodiments, the predefined action is based at least in part on a context of object 120. For example, the context may include the individual (e.g., object 120) sitting versus standing.

Moreover, while the preceding discussion provided an illustration of using the wireless-reflected signal to determine range 122, in other embodiments electronic device 110 may use wireless-reflected signals to determine a direction or angle of approach of object 120, in addition to or instead of determining range 122 and/or rate of change information. This additional information may be used to determine the intent of the individual and, thus, may be used to determine whether (or not) electronic device 110 selectively performs the predefined action.

Figure 2:
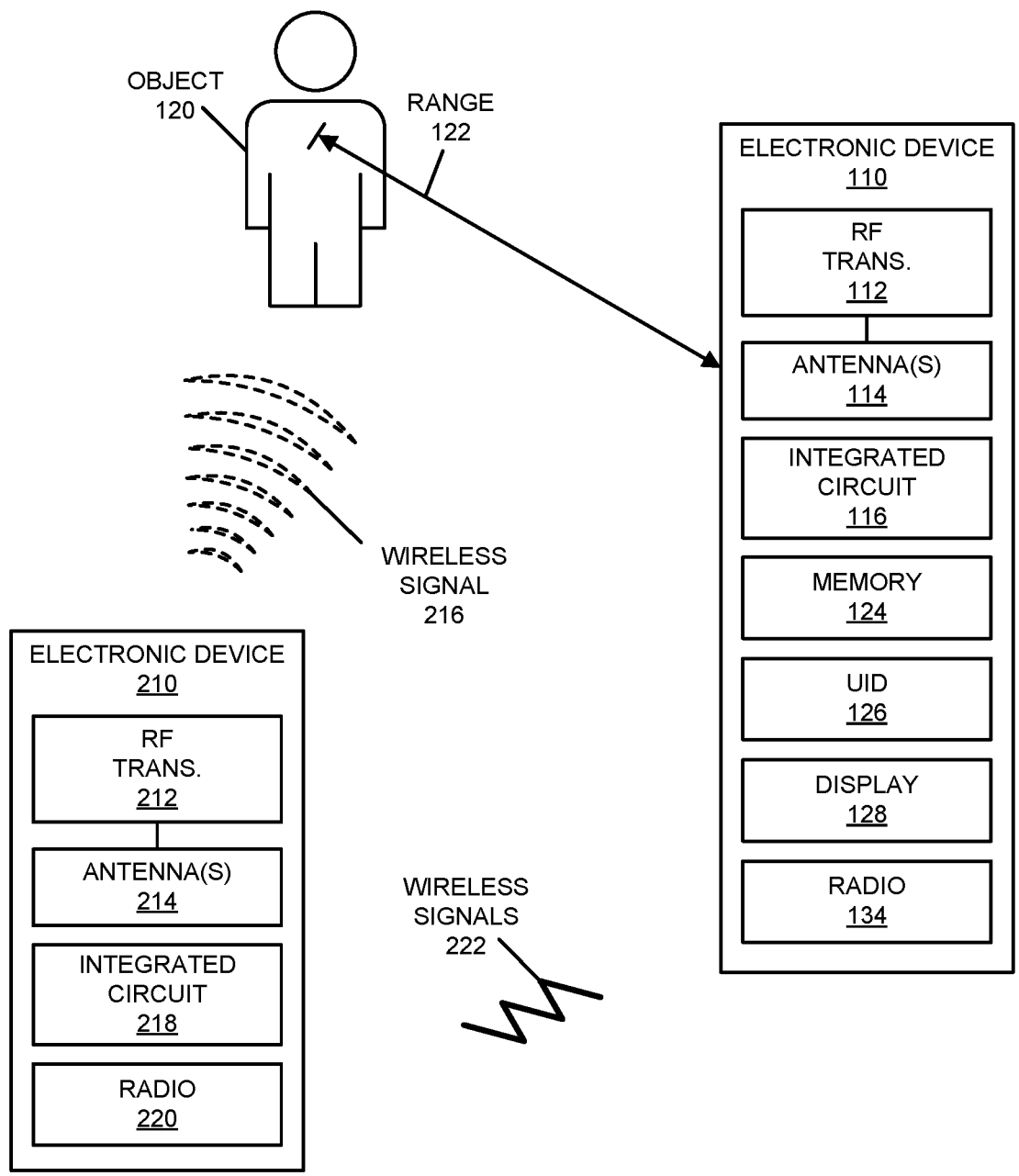
FIG. 2 is a block diagram illustrating an example of measurements performed by an electronic device and communication between electronic devices.

Furthermore, while the preceding electronic device 110 performed the aforementioned operations, in other embodiments at least some of these operations are performed collaboratively. This is shown in FIG. 2, which presents a block diagram illustrating an example of measurements performed by electronic device 210 and communication between electronic device 110 and electronic device 210. For example, electronic device 210 may include: a smartphone or a wearable device, e.g., a smartwatch.

During operation, electronic device 210 may transmit a wireless signal 216 (such as UWB) using RF transceiver 212 and the one or more antennas 214. Then, electronic device 210 may receive or measure a wireless-return signal associated with object 120 within a time-of-flight of wireless signal 216 in a direct path between electronic device 210 and object 120, and may measure a second wireless-return signal associated with electronic device 110 within a time-of-flight of wireless signal 216 in a direct path between electronic device 110 and electronic device 210. Next, based at least in part on the wireless-return signal and the second wireless-return signal, integrated circuit 218 (such as a processor or control logic) may determine a range 122 between electronic device 110 and object 120. When range 122 between electronic device 110 and object 120 is less than a threshold value (such as, e.g., 1-10 m), integrated circuit 218 may further determine whether range 122 between electronic device 110 and object 120 is varying (such as decreasing).

When range 122 satisfies the threshold value and is determined to be decreasing, integrated circuit 218 may instruct electronic device 110 to perform a predefined action. For example, radio 220 in electronic device 210 may transmit one or more packets or frames to electronic device 110 using wireless signals 222 (illustrated by the jagged line in FIG. 2) with the instruction to perform the predefined action. After radio 134 in electronic device 110 receives the one or more packets or frames, it may provide the instruction to integrated circuit 116, which may cause electronic device 110 to perform the predefined action. Thus, in some embodiments, the operations in the disclosed techniques may involve unilateral or bilateral communication between electronic devices 110 and 210.

Referring back to FIG. 1, RF transceiver 112 and the one or more antennas 114 may have a static or a dynamic field of view (such as an angular range that is greater than 90° and less than 180°). Thus, RF transceiver 112 and the one or more antennas 114 may have a directional antenna pattern that is other than (or different from) an omnidirectional antenna pattern. In some embodiments, RF transceiver 112 and the one or more antennas 114 may provide 360° coverage around electronic device 110, at least in a horizontal plane.

While the preceding discussion illustrated the disclosed techniques using pulses, in other embodiments (e.g., frequency-modulated) continuous-wave signals (such as chirp or pulse-compressed signals) may be used, and range 122 may be determined from amplitude modulation, frequency modulation and/or phase modulation of reflected signals. Moreover, operations in the disclosed techniques may be performed in the time and/or frequency domain, and may be implemented using analog and/or digital techniques.

In some embodiments, electronic device 110 and electronic device 210 may communicate wirelessly, e.g., in a WLAN using an IEEE 802.11 communication protocol. Thus, electronic device 110 and electronic device 210 may be associated with each other. For example, electronic device 110 and electronic device 210 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). In these embodiments, electronic device 110 may be or may provide the functions of an access point that facilitates access to a network, such as the Internet, via an Ethernet protocol, and may be a physical access point or a virtual or 'software' access point that is implemented on a computer or an electronic device. However, in some embodiments, electronic device 110 and/or electronic device 112 may communicate using a different communication protocol. For example, electronic devices 110 and/or 112 may communicate with a base station in a cellular-telephone network, e.g., using a cellular-telephone communication protocol.

Figure 9:
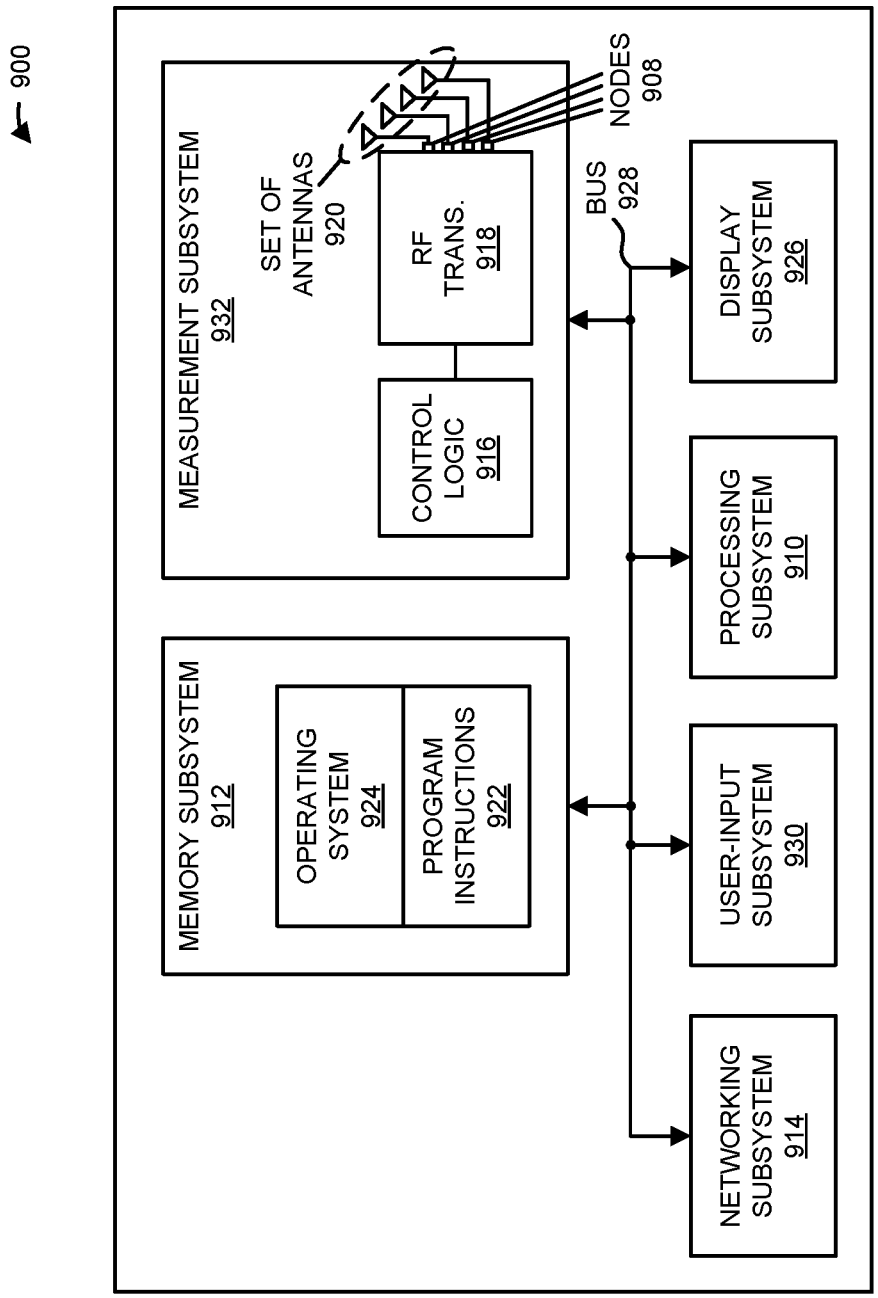
FIG. 9 is a block diagram illustrating an example of an electronic device, e.g., of FIG. 1.

As described further below with reference to FIG. 9, electronic device 110 and/or electronic device 210 may include subsystems, such as a networking subsystem, a memory subsystem, a processor subsystem, a measurement subsystem and an analysis subsystem. In general, electronic device 110 and/or electronic device 210 may include any electronic device with a measurement subsystem that enables electronic device 110 and/or electronic device 210 to perform measurements (such as wireless measurements), and an analysis subsystem that determines range 122. In addition, electronic device 110 and/or electronic device 210 may include RF transceivers and/or radios in the networking subsystems. In some embodiments, electronic device 110 and electronic device 210 can include (or can be included within) any electronic devices with networking subsystems that enable electronic device 110 and electronic device 210, respectively, to wirelessly communicate with another electronic device. This can include transmitting pulses for use in the disclosed techniques. Alternatively or additionally, this can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

Note that electronic device 110 and/or electronic device 210 may be compatible with an IEEE 802.11 standard that includes trigger-based channel access (such as IEEE 802.11ax). However, electronic device 110 and/or electronic device 210 may also communicate with one or more legacy electronic devices that are not compatible with the IEEE 802.11 standard (i.e., that do not use multi-user trigger-based channel access). In some embodiments, electronic device 110 and/or electronic device 210 use multi-user transmission (such as orthogonal frequency division multiple access or OFDMA). For example, a radio in electronic device 110 (such as radio 134) may provide a trigger frame for one or more electronic devices. Moreover, after radio 220 receives a trigger frame, radio 220 may provide a group acknowledgment to radio 134. For example, radio 220 may provide the acknowledgment during an assigned time slot and/or in an assigned channel in the group acknowledgment. However, in some embodiments the one or more electronic devices may individually provide acknowledgments to radio 134. Thus, after radio 220 receives the trigger frame, radios (such as radio 220) in the one or more electronic devices may provide an acknowledgment to radio 134.

In the described embodiments, processing a packet or frame in electronic device 110 and electronic device 210 includes: receiving wireless signals encoding a packet or a frame; decoding/extracting the packet or frame from received wireless signals to acquire the packet or frame; and processing the packet or frame to determine information contained in the packet or frame (such as data in the payload).

In general, the communication via pulses, a WLAN and/or a cellular-telephone network in the disclosed techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the environment shown in FIGS. 1 and 2 as examples, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, different electronic devices may be transmitting and/or receiving wireless signals.

Figure 3:
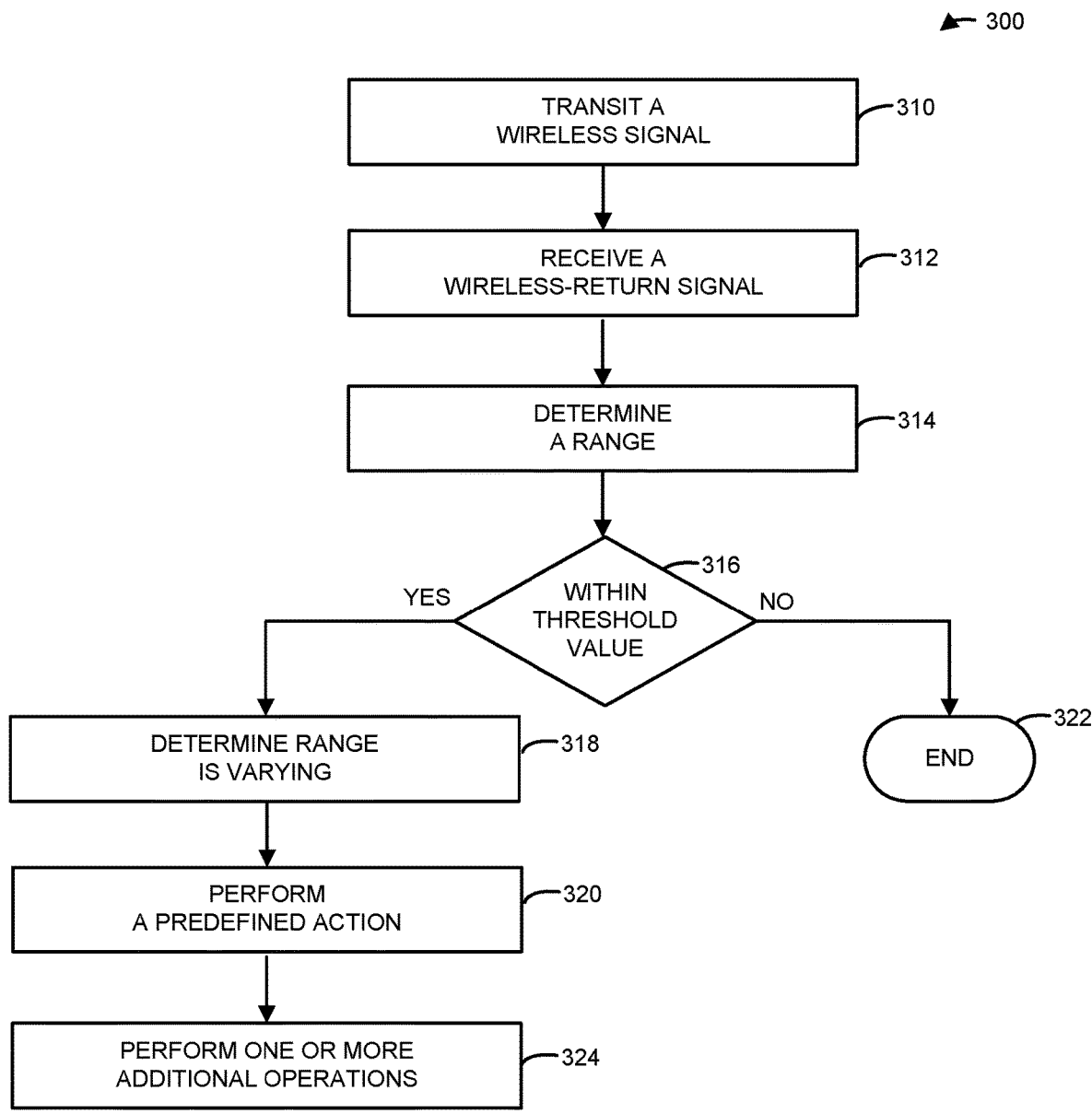
FIG. 3 is a flow diagram illustrating an example method for selectively performing a predefined action using an electronic device, e.g., of FIG. 1.

FIG. 3 presents a flow diagram illustrating an example method 300 for selectively performing a predefined action. This method may be performed by an electronic device, such as electronic device 110 in FIG. 1 or electronic device 210 in FIG. 2. During operation, the electronic device may transmit a wireless signal (operation 310). Then, the electronic device may receive a wireless-return signal (operation 312) associated with an object (such as an individual) within a time-of-flight of the wireless signal in a direct path (or a wireless range) between the electronic device and the object. Moreover, the electronic device may determine a range (operation 314) between the electronic device and the object, based at least in part on the wireless-return signal. When the range between the electronic device and the object satisfies a threshold value (operation 316), the electronic device may perform the predefined action (operation 320). Optionally, the electronic device may further determine whether the range between the electronic device and the object is varying (operation 318), e.g., at a sufficient rate, before determining whether to perform the predefined action (operation 320). Otherwise, method 300 may end (operation 322) or repeat (operation 310).

In some embodiments, the threshold value may correspond to a time for the electronic device to transition from a first state to a second state, and the predefined action may include transitioning the electronic device from the first state to the second state. Note that the first state may have a lower power consumption than the second state. For example, in the second state, a memory in the electronic device (such as a solid-state drive) may be powered on. In other examples, a processor, a radio interface, and/or other such circuitry may be powered on or transitioned to a higher power state instead of or in addition to the memory.

Moreover, in some implementations, the predefined action may include changing a font (e.g., varying the size) or a user interface displayed on the display associated with the electronic device. Alternatively or additionally, in some implementations, the predefined action may include changing content displayed on the display associated with the electronic device. In some embodiments, the predefined action is further based at least in part on a context of the object. For example, when the object is an individual, the context may include the individual sitting or standing. Thus, an activity notification (e.g., a time-to-stand notification) may be provided if the individual is idle for a sufficiently long time (such as more than 10 min, more than 30 min, more than 60 min, etc.).

In some embodiments, the electronic device may perform one or more optional additional operations (operation 324). For example, the electronic device may: detect, after transitioning to the second state, contact by an individual with a user-interface device associated with the electronic device; and transition a display associated with the electronic device from a lower-power state to a higher-power state.

Furthermore, the electronic device may modify the threshold value based at least in part on an environment of the electronic device. For example, the environment may include a distance between the electronic device and a boundary in the environment.

Additionally, in some implementations, the transitioning from the first state to the second state is further based at least in part on an intent associated with the object. For example, the intent may correspond to a rate of the change, e.g., of the relative separation.

Figure 4:
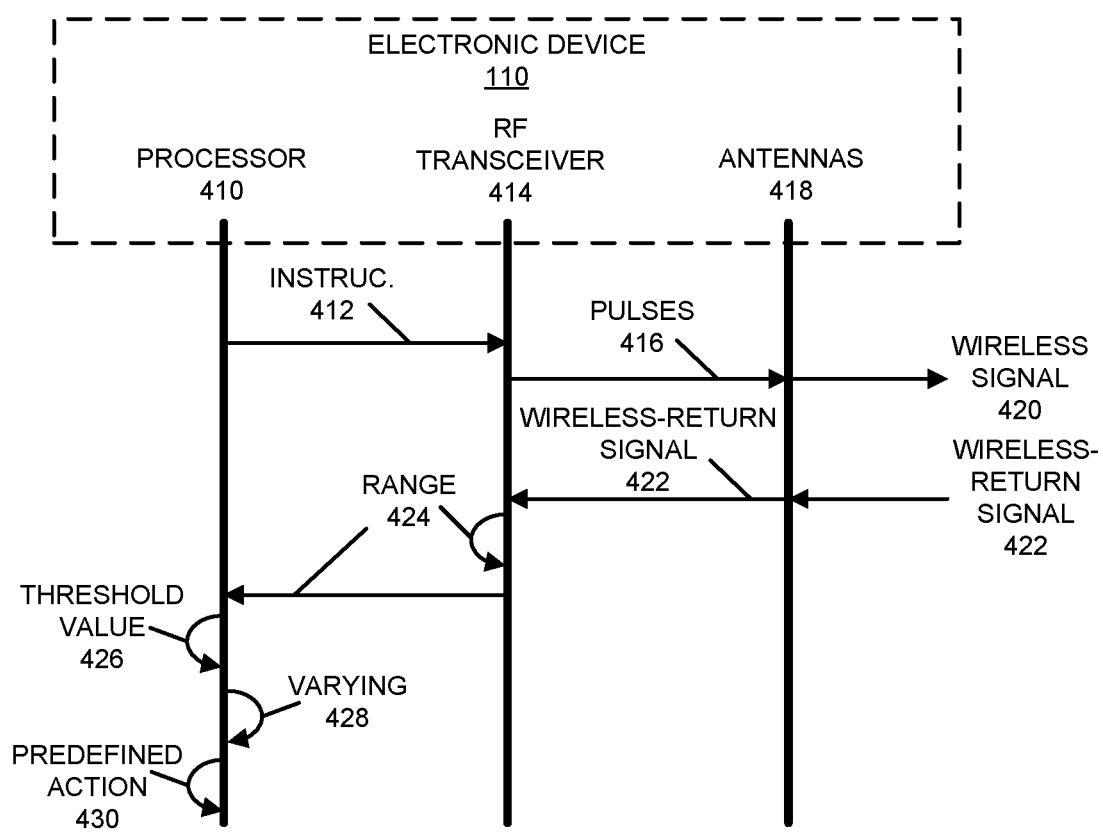
FIG. 4 is a flow diagram illustrating an example of communication among components in an electronic device, e.g., of FIG. 1.

The measurements techniques are further illustrated in FIG. 4, which presents a flow diagram illustrating an example of communication among components in electronic device 110. During operation, processor 410 in electronic device 110 may instruct 412 RF transceiver 414 to provide pulses 416 to one or more antennas 418 in order to transmit a wireless signal 420. Then, RF transceiver 414 may receive a wireless-return signal 422 associated with an object (such as an individual) from the one or more antennas 418, within a time-of-flight of wireless signal 420 in a direct path between electronic device 110 and the object. After receiving wireless-return signal 422, RF transceiver 414 may determine a range 424 between electronic device 110 and the object, based at least in part on wireless-return signal 422. Next, RF transceiver 414 may provide range 424 to processor 410. Moreover, when range 424 between electronic device 110 and the object satisfies a threshold value 426, processor 410 may perform a remedial action 430 (such as transitioning from a first state to a second state). Optionally, processor 410 also may determine whether range 424 between electronic device 110 and the object is varying 428 (e.g., decreasing at a sufficient rate), as a condition of performing the remedial action 430

While communication between the components in FIG. 4 is illustrated with unilateral or bilateral communication (e.g., lines having a single arrow or dual arrows), in general a given communication operation may be unilateral or bilateral.

In some embodiments, an electronic device (such as a computer, a laptop, a television, etc.) may remain powered on even when a user is not present. The increased power consumption thus may increase the environmental impact, e.g., carbon footprint, of the electronic device. Moreover, for many electronic devices, the user interface (such as the font size, contrast, etc.) may remain the same regardless of the user's location. The content displayed on many electronic devices also may remain unchanged, regardless of the user's location. Thus, the displayed content may be static, which may adversely affect user engagement. Similarly, many voice assistants may have the same or a constant volume, regardless of the user's range from the associated electronic device.

In the disclosed techniques, the user's presence, absolute range, and/or time-varying range may be used to adapt or change a state of an electronic device. For example, in the disclosed techniques, an electronic device may selectively perform a predefined action based on presence and/or range (absolute and/or time-varying). This action may include any/all of: powering the electronic device on or off; switching between a lower-power mode (e.g., sleep) and a higher-power mode (e.g., active); changing a user-interface characteristic (e.g., font size, font color, brightness, contrast, etc.) or a user interface; changing displayed content; and/or displaying a dynamic wallpaper in order to provide an immersive experience for a user. Note that the disclosed techniques may be based, at least in part, on time-of-flight measurements. For example, the time-of-flight measurements may use any/all of: radar, lidar, ultrasound, sound (such as an acoustic wave), infrared, and/or an optical signal (such as in the visible spectrum). In some embodiments, the time-of-flight measurements may use UWB pulsed radar operating between 6-8 GHz.

Figure 5:
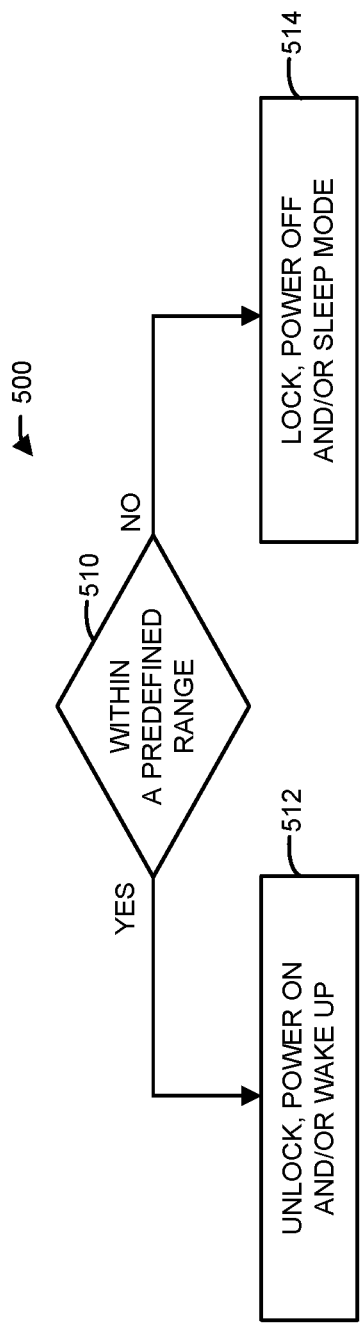
FIG. 5 is a flow diagram illustrating an example method for selectively performing a predefined action using an electronic device, e.g., of FIG. 1.

Examples of the predefined action are shown in FIGS. 5-8. Notably, FIG. 5 presents a flow diagram illustrating an example method 500 for selectively performing a predefined action. This method may be performed by an electronic device, such as electronic device 110 in FIG. 1 or electronic device 210 in FIG. 2. During operation, the electronic device may detect that a user is within a predefined range (operation 510) of an electronic device (such as the predefined range of 1-10 m). When a predefined range condition is satisfied, the electronic device may perform a predefined action. For example, the electronic device may unlock, power on a display, and/or wake up one or more components (operation 512). Alternatively, when the user is not within the predefined range (operation 510), the electronic device may remain in the current state, lock, turn a display off, transition one or more components to a lower-power state, and/or transition to a sleep mode (operation 514).

This capability may facilitate reduced power consumption, such as reduced power consumption when a user is absent. Moreover, method 500 may improve the apparent responsiveness of the electronic device to the user, e.g., when waking up.

Figure 6:
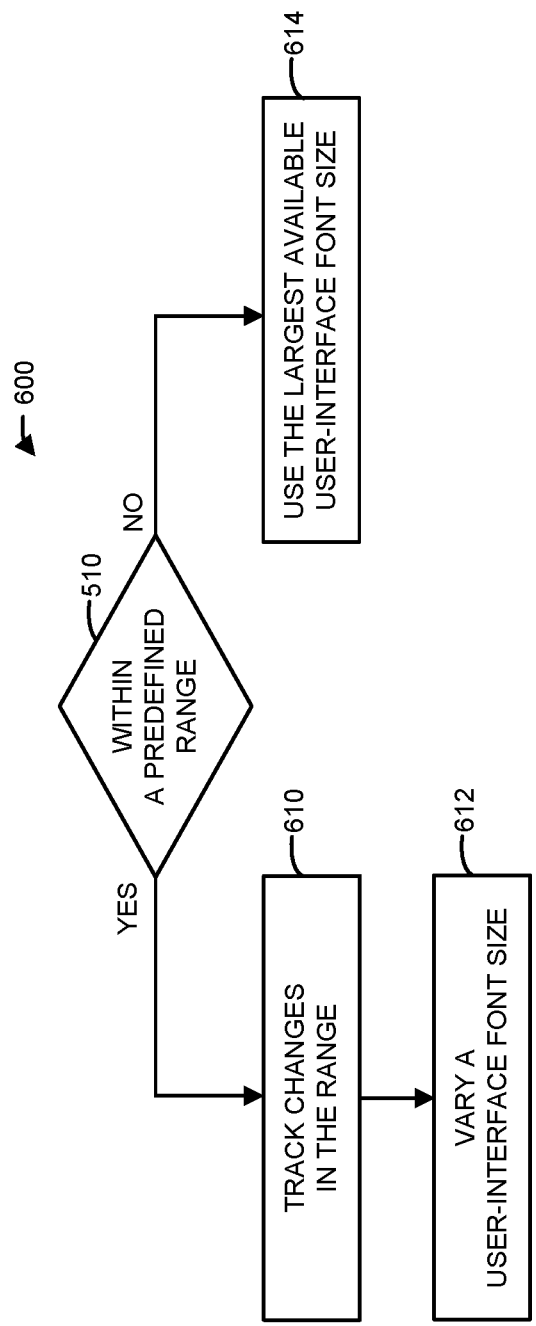
FIG. 6 is a flow diagram illustrating an example method for selectively performing a predefined action using an electronic device, e.g., of FIG. 1.

FIG. 6 presents a flow diagram illustrating an example method 600 for selectively performing a predefined action. This method may be performed by an electronic device, such as electronic device 110 in FIG. 1 or electronic device 210 in FIG. 2. During operation, the electronic device may detect that a user is within a predefined range (or distance) (operation 510) of an electronic device. When the predefined range threshold is satisfied, the electronic device may perform a predefined action. For example, the electronic device may track changes in the range of the user (operation 610) or otherwise periodically determine the user's range, and may vary a user-interface font size (operation 612) and/or one or more other user interface characteristics (e.g., font, font color, brightness, contrast, etc.) based at least in part on the range. Alternatively, when a user is not within the predefined range (operation 510), the electronic device may use the largest available user-interface font size (operation 614), e.g., when a display is on.

Thus, as an example, the electronic device may use the largest available user-interface font size when the user is absent (e.g., not present proximate to the electronic device). This may allow the displayed content to be viewed from long distances, such as in a home or office. Moreover, by scaling the user-interface font size (and/or other aspects of a user interface) based at least in part on a range of the user from the electronic device, the electronic device may provide a unique user experience when the user is within certain range from the electronic device. This may improve the readability of documents or the viewing experience.

Figure 7:
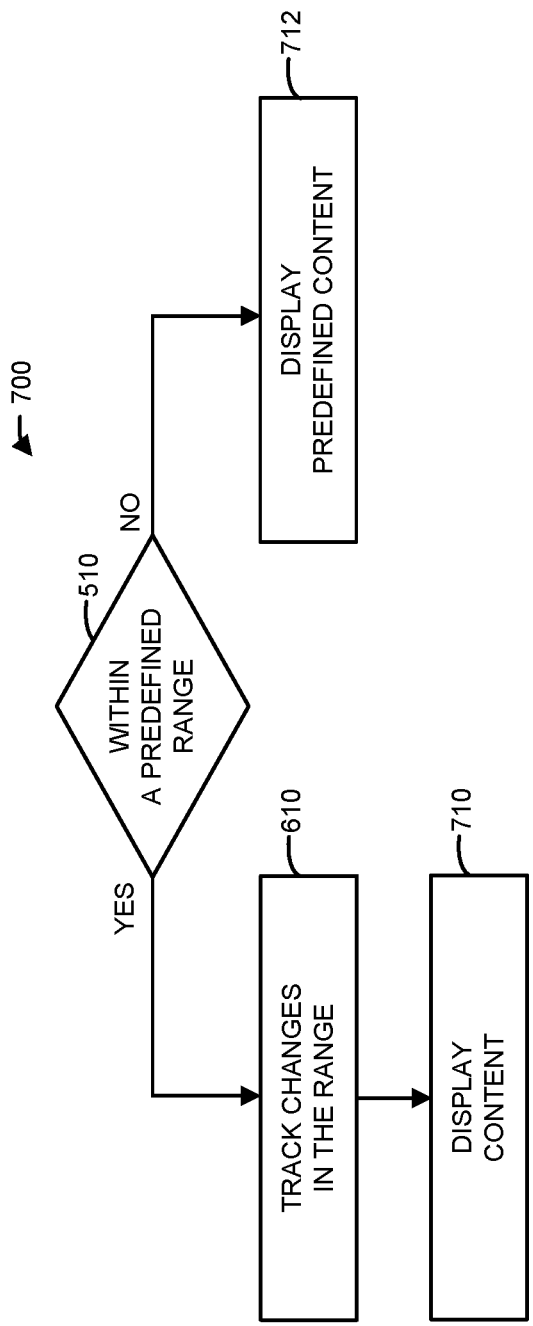
FIG. 7 is a flow diagram illustrating an example method for selectively performing a predefined action using an electronic device, e.g., of FIG. 1.

FIG. 7 presents a flow diagram illustrating an example method 700 for selectively performing a predefined action. This method may be performed by an electronic device, such as electronic device 110 in FIG. 1 or electronic device 210 in FIG. 2. During operation, the electronic device may detect that a user is within a predefined range (operation 510) of an electronic device. When a predefined range threshold is satisfied, the electronic device may perform a predefined action. For example, the electronic device may track changes in the range of the user (operation 610) or otherwise periodically determine the user's range, and may display content (operation 710) based at least in part on the range (e.g., the displayed content may be dynamically varied as the range changes). Alternatively, when the user is not within the predefined range (operation 510), the electronic device may display default or predefined content (operation 712).

Thus, the displayed content may be varied depending on the range of the user from the electronic device. For example, when the user is not present proximate to the electronic device or is located more than a threshold distance away from the electronic device, the electronic device may display a default image, e.g., an image of a clock or the current time using the maximum user-interface font size. Then, as a user approaches the electronic device, the content, e.g., the clock size, may be varied. Alternatively or additionally, as a user approaches the electronic device, one or more other items of information, such as the date, weather, and/or stock information, may be displayed. In some embodiments, the disclosed techniques may be used to adjust a volume control, e.g., for a voice assistant or a television, as the range (or distance) changes.

Figure 8:
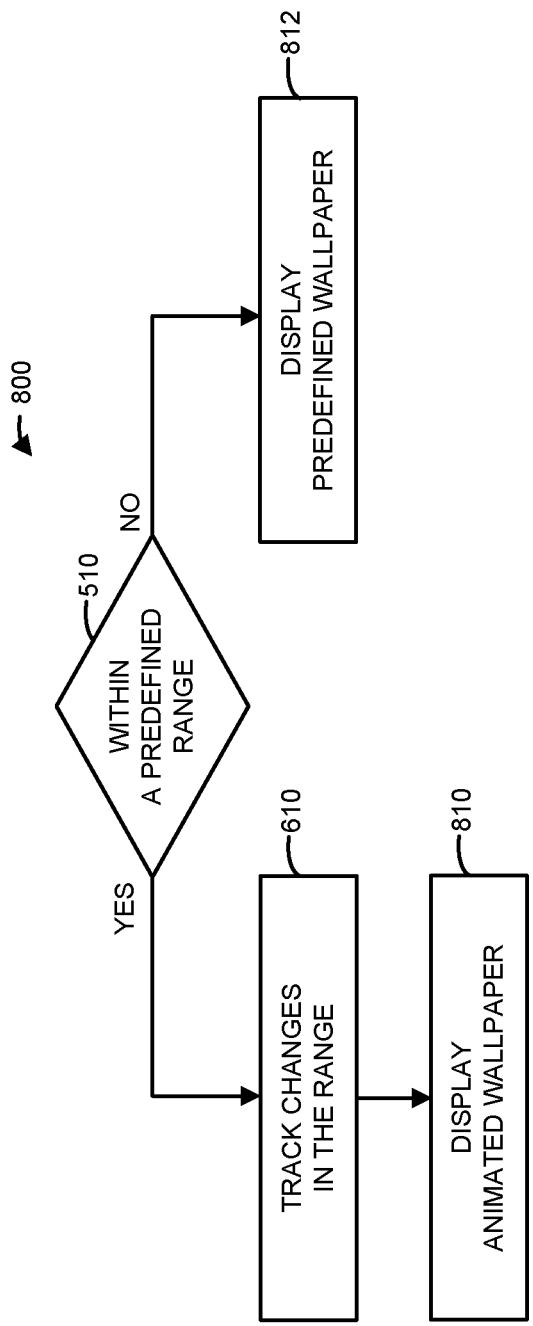
FIG. 8 is a flow diagram illustrating an example method for selectively performing a predefined action using an electronic device, e.g., of FIG. 1.

FIG. 8 presents a flow diagram illustrating an example method 800 for selectively performing a remedial action. This method may be performed by an electronic device, such as electronic device 110 in FIG. 1 or electronic device 210 in FIG. 2. During operation, the electronic device may detect that a user is within a predefined range (operation 510) of an electronic device. When the predetermined range threshold is satisfied, the electronic device may perform a remedial action. For example, the electronic device may track changes in the range of the user (operation 610) or otherwise periodically determine the user's range, and may display selected content, such as an animated wallpaper (operation 810), based at least in part on the range. Alternatively, when a user is not within the predefined range (operation 510), the electronic device may display a default, different, or static wallpaper (operation 812) or image.

This capability may allow an electronic device to provide an engaging or an immersive user experience of a 'live' or adaptive wallpaper based on the range of the user from the electronic device. Alternatively, when the user is not proximate to the electronic device, the electronic device may have a different display, e.g., a stationary or static wallpaper.

In some embodiments of the disclosed techniques, aspects of two or more methods can be combined, including combining power reduction aspects with dynamic display aspects. In some embodiments of method 300 (FIG. 3), method 500 (FIG. 5), method 600 (FIG. 6), method 700 (FIG. 7) and/or method 800 (FIG. 8) there may be additional or fewer operations. Further, one or more different operations may be included. Moreover, the order of the operations may be changed, and/or two or more operations may be combined into a single operation or performed at least partially in parallel.

Note that the embodiments of the disclosed techniques may include identification of the individual (such as biometric identification, e.g., facial recognition). This may provide enhanced security (e.g., the electronic device may only transition from the first state to the second state for a known or authorized user). Alternatively or additionally, the identification of the individual may allow the electronic device to provide different content for an adult versus a minor (and, more generally, to provide parental control of the content). In some embodiments, when the presence of a second individual is detected, the electronic device may automatically enter a privacy mode, so that sensitive information and/or notifications are hidden or are not displayed.

Moreover, the embodiments of the disclosed techniques may distinguish between a human and an animal (such as a pet). For example, radar and/or Doppler information may be used to identify a human versus a pet. Notably, a human and a pet may have different signatures, such as: standing on two feet versus four paws, different respiration rates, etc. Based on this identification, the electronic device may have different capabilities (e.g., a different application may execute) and/or different content may be displayed for a human versus a pet.

Furthermore, separately or in addition to radar, the embodiments of the disclosed techniques may one or more different types of sensors. Additionally, embodiments of the disclosed techniques may monitor a gaze direction and/or a physiological response of a user. This information may be used to provide feedback as to what is of interest to the user, so that the displayed content can be dynamically updated.

In summary, the disclosed techniques may facilitate automatic and dynamic responses by the electronic device to changes in the surrounding environment. Moreover, this capability may enable a wide variety of location or proximity-based applications. Consequently, the disclosed techniques may improve the user experience when using the electronic device.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 9 presents a block diagram of an electronic device 900 (which may be a cellular telephone, a smartwatch, an access point, a wireless speaker, an IoT device, a computer, a tablet, another electronic device, etc.) in accordance with some embodiments. This electronic device includes processing subsystem 910, memory subsystem 912, networking subsystem 914 and measurement subsystem 932. Processing subsystem 910 includes one or more devices configured to perform computational operations. For example, processing subsystem 910 can include one or more microprocessors, application-specific integrated circuits (ASICs), microcontrollers, graphics processing units (GPUs), programmable-logic devices, and/or one or more digital signal processors (DSPs).

Memory subsystem 912 includes one or more devices for storing data and/or instructions for processing subsystem 910, networking subsystem 914 and/or measurement subsystem 932. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: program instructions or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), such as: control logic, an interface circuit and a set of antennas (or antenna elements) in an adaptive array that can be selectively turned on and/or off by control logic to create a variety of optional antenna patterns or 'beam patterns.' Alternatively, instead of the set of antennas, in some embodiments electronic device 900 includes one or more nodes, e.g., a pad, which can be coupled to the set of antennas. Thus, electronic device 900 may or may not include the set of antennas. For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a WiFi® networking system), an Ethernet networking system, and/or another networking system.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or frame frames and/or scanning for advertising frames transmitted by other electronic devices.

Measurement subsystem 932 includes one or more devices configured to transmit wireless (e.g., radar) signals and to perform wireless measurements, such as: control logic 916, one or more RF transceivers 918, and a set of one or more antennas 920 (or antenna elements) that are electrically coupled to the one or more RF transceivers 918 at nodes 908 (such as, e.g., one or more pads). The one or more RF transceivers may or may not be synchronized with each other. In some embodiments, set of antennas 920 have a directional antenna pattern that is other than or different from an omnidirectional antenna pattern.

Within electronic device 900, processing subsystem 910, memory subsystem 912, networking subsystem 914 and measurement subsystem 932 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, a keypad, a dial, a touch screen, an audio or voice input interface, a visual/image capture input interface, an input in the form of sensor data, etc.

Electronic device 900 can be (or can be included in) any electronic device with at least one network interface or a measurement subsystem. For example, electronic device 900 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. In some embodiments, electronic device may include an analysis subsystem that performs at least some of the operations in the disclosed techniques. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in the one or more RF transceivers 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Alternatively or additionally, an integrated circuit (which is sometimes referred to as a 'measurement circuit') may implement some or all of the functionality of measurement subsystem 932. This integrated circuit may include hardware and/or software mechanisms that are used for transmitting wireless signals from electronic device 900 and receiving wireless signals at electronic device 900.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a UWB communication protocol as an illustrative example, in other embodiments a wide variety of communication protocols and, more generally, communication techniques may be used (such as, e.g., lidar, infrared, ultrasound, sound, an optical signal in the visible spectrum, etc.). Thus, the disclosed techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the disclosed techniques may be implemented using program instructions 922, operating system 924 (such as a driver for an interface circuit in networking subsystem 914 or the one or more RF transceivers 918 in measurement subsystem 932) or in firmware in an interface circuit networking subsystem 914 or in measurement subsystem 932. Alternatively or additionally, at least some of the operations in the disclosed techniques may be implemented in a physical layer, such as hardware in an interface circuit in networking subsystem 914 or in measurement subsystem 932. In some embodiments, the disclosed techniques are implemented, at least in part, in a MAC layer and/or in a physical layer in an interface circuit in networking subsystem 914.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the disclosed techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. More generally, a variety of different disclosed techniques may be used, such as: radar, lidar, ultrasound, sound (such as an acoustic wave), infrared and/or an optical signal (such as in the visible spectrum).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   a radio-frequency (RF) transceiver communicatively coupled to the antenna; and
   an integrated circuit coupled to the RF transceiver, wherein the electronic device is configured to:
   transmit a wireless signal;
   receive a wireless-return signal associated with an object;
   determine a range between the electronic device and the object, based at least in part on the wireless-return signal; and
   when the range between the electronic device and the object satisfies a threshold value:
      perform, when a rate of change of the range satisfies a second non-zero threshold value, a predefined action, wherein the threshold value corresponds to a time for the electronic device to transition from a first state to a second state and corresponds to the rate of change of the range;
      wherein the predefined action comprises transitioning the electronic device from the first state to the second state; and
      wherein the transitioning comprises transitioning a first component in the electronic device at different time than the transitioning of a second component in the electronic device based at least in part on different respective times for the first and second components to transition from the first state to the second state; and
   modify the threshold value based at least in part on an environment of the electronic device that impacts multi-path or interference signals.

2. The electronic device of claim 1, wherein the first state is associated with a lower power consumption than the second state.

3. The electronic device of claim 1, wherein, in the second state, a memory in the electronic device is powered on.

4. The electronic device of claim 3, wherein the memory comprises a solid-state drive.

5. The electronic device of claim 1, wherein the electronic device is configured to:
   detect, after transitioning to the second state, contact with a user-interface component associated with the electronic device; and
   transition a display associated with the electronic device from a lower-power state to a higher-power state.

6. The electronic device of claim 1, wherein the environment comprises a distance between the electronic device and a boundary in the environment.

7. The electronic device of claim 1, wherein the object comprises a person.

8. The electronic device of claim 1, wherein the predefined action comprises transitioning the electronic device from the first state to the second state based at least in part on an intent associated with the object.

9. The electronic device of claim 1, wherein the predefined action is performed based at least in part on an angle of approach of the object.

10. The electronic device of claim 1, wherein the predefined action comprises changing a user interface presented on a display associated with the electronic device.

11. The electronic device of claim 1, wherein the predefined action comprises changing an item of content presented on a display associated with the electronic device.

12. The electronic device of claim 1, wherein the electronic device is further configured to:
   base the predefined action at least in part on a context of the object; and wherein, when the object comprises a person, the context comprises the person sitting or standing.

13. A non-transitory computer-readable storage medium for use in conjunction with an electronic device, the computer-readable storage medium storing program instructions that, when executed by the electronic device, cause the electronic device to selectively perform a predefined action by carrying out operations comprising:
transmitting a wireless signal;
receiving a wireless-return signal associated with an object;
determining a range between the electronic device and the object, based at least in part on the wireless-return signal; and
performing, when the range between the electronic device and the object satisfies a threshold value:
performing, when a rate of change of the range satisfies a second non-zero threshold value, the predefined action, wherein the threshold value corresponds to a time for the electronic device to transition from a first state to a second state and corresponds to the rate of change of the range;
wherein the predefined action comprises transitioning the electronic device from the first state to the second state; and
wherein the transitioning comprises transitioning a first component in the electronic device at different time than the transitioning of a second component in the electronic device based at least in part on different respective times for the first and second components to transition from the first state to the second state; and
modifying the threshold value based at least in part on an environment of the electronic device that impacts multi-path or interference signals.

14. The non-transitory computer-readable storage medium of claim 13, wherein the predefined action is performed based at least in part on an angle of approach of the object.

15. The non-transitory computer-readable storage medium of claim 13, wherein the predefined action comprises changing a font in a user interface presented on a display associated with the electronic device.

16. The non-transitory computer-readable storage medium of claim 13, wherein the predefined action comprises changing a volume associated with the electronic device.

17. A method for selectively performing a predefined action, comprising:
by an electronic device:
transmitting a wireless signal;
receiving a wireless-return signal associated with an object;
determining a range between the electronic device and the object, based at least in part on the wireless-return signal; and
when the range between the electronic device and the object satisfies a threshold value:
performing, when a rate of change of the range satisfies a second non-zero threshold value, the predefined action, wherein the threshold value corresponds to a time for the electronic device to transition from a first state to a second state and corresponds to the rate of change of the range;
wherein the predefined action comprises transitioning the electronic device from the first state to the second state; and
wherein the transitioning comprises transitioning a first component in the electronic device at different time than the transitioning of a second component in the electronic device based at least in part on different respective times for the first and second components to transition from the first state to the second state; and
modifying the threshold value based at least in part on an environment of the electronic device that impacts multi-path or interference signals.

18. The method of claim 17, wherein the predefined action is performed based at least in part on an angle of approach of the object.

19. The method of claim 17, wherein the first state is associated with a lower power consumption than the second state.

20. The method of claim 17, wherein the environment comprises a distance between the electronic device and a boundary in the environment.

* * * * *